United States Patent [19]

Erlandson et al.

[11] Patent Number: 6,098,783
[45] Date of Patent: Aug. 8, 2000

[54] TRANSFER MACHINE TIPPER MECHANISM

[75] Inventors: Greg E. Erlandson, Brooklyn Center; Jack T. Mowry, Ramsey, both of Minn.

[73] Assignee: NEOS, Inc., Elk River, Minn.

[21] Appl. No.: 08/882,421

[22] Filed: Jun. 25, 1997

[51] Int. Cl.[7] .................................................. B65G 47/24
[52] U.S. Cl. ........................ 198/413; 198/403; 414/403
[58] Field of Search ........................... 198/403, 410–413; 414/403

[56] References Cited

U.S. PATENT DOCUMENTS

| | | | |
|---|---|---|---|
| 2,734,618 | 2/1956 | Palmer | 198/403 |
| 4,484,675 | 11/1984 | Doherty et al. | 198/413 |
| 4,907,686 | 3/1990 | Cotic | 198/403 |
| 5,006,037 | 4/1991 | Bluemle | 198/403 |
| 5,412,220 | 5/1995 | Mooke | 198/403 |

*Primary Examiner*—Joseph E. Valenza
*Attorney, Agent, or Firm*—Nawrocki, Rooney & Sivertson, P.A.

[57] ABSTRACT

A transfer machine tipper mechanism for overturning a container being moved from a first station to a second station. The transfer machine tipper mechanism has a plurality of actuators to engage and rotate the container. The actuators are sequenced to rotate the container from an initial orientation to a final orientation wherein the final orientation is defined by the top and bottom of the container being inverted from the initial orientation.

22 Claims, 7 Drawing Sheets

TRANSFER MACHINE TIPPER MECHANISM

BACKGROUND OF THE INVENTION

1. Field of the Invention

The present invention relates to a tipper mechanism to reposition a container, and more particularly, to such tipping mechanism having a plurality of actuating devices sequenced to overturn the container.

2. Description of the Prior Art

In manufacturing or assembly processes, containers may be moved through a variety of steps. These steps may involve filling the container with product as well as sealing and labeling the container. At the conclusion of the manufacturing or assembly process the containers may be discharged while other containers are moved through the same processing steps. Once the containers are discharged, they are typically moved to a storage location or warehouse to await shipment to customers.

It may be desirable to reposition the containers during the manufacturing or assembly process. For example, the step of sealing the container may require that the container first be overturned. It also may be desirable to reposition the container before transport to a warehouse for storage in order to facilitate storage of the container. For example, asymmetrically designed containers may require less storage space when in an inverted position. Repositioning the containers prior to transport to a warehouse may reduce the amount of handling necessary to store the containers in an inverted position.

Containers may be manually repositioned. This approach however has disadvantages. Repetitive stress injuries may result from the continuing motions required to reposition containers on manufacturing or assembly lines. Unfortunately, if a repetitive stress injury does occur, the manufacturing line throughput rate may suffer while the injury is attended to. This may result in additional business related costs due to lost manufacturing throughput and medical expenses.

Often times it is desirable to move containers through the assembly process at high throughput rates. The desired throughput rates may not be easily accommodated by human interaction however. For example, manual repositioning would be difficult if the containers were heavy or large in size. Unfortunately, the assembly process throughput rate must be reduced under these circumstances to levels appropriate for human interaction.

Various attempts have been made in the prior art to overturn containers. In one prior art machine, a container is received by a first conveyor belt and is moved up an inclined portion. Once the container reaches the end of the inclined portion, the container may tumble and land on an opposite end onto a second conveyor belt. The end of the inclined portion is optimally positioned at a height large enough to allow the container's forward momentum to cause the container to tumble and land on the opposite end on the second conveyor belt. This approach unfortunately has the disadvantage of potentially damaging the container. The container may be made of destructible materials such as cardboard. In addition, the containers must be dropped from heights sufficient to provide for overturning.

In another prior art machine, the container is positioned on a conveyor belt to be received by mechanical gripping arms. These mechanical gripping arms may grip the container, then rotate the container by 180° by tipping the container end-over-end. The mechanical gripping arms may then release the container back onto the conveyor belt. This approach unfortunately requires a difficult mechanical design to grip the containers without damage.

SUMMARY OF THE INVENTION

The present invention overcomes the disadvantages found in the prior art by providing a transfer machine tipping mechanism for overturning a container being moved from a first station to a second station. The transfer machine tipper mechanism has a plurality of actuators to engage and rotate the container. The actuators are sequenced to rotate the container from an initial orientation to a final orientation wherein the final orientation is defined by the top and bottom of the container being inverted from the initial orientation.

In a preferred embodiment, the transfer machine tipper mechanism is provided in the environment of a workpiece approaching mechanism. The workpiece approaching mechanism includes a conveyor assembly and a tipper mechanism. The conveyor assembly comprises a conveyor belt, a conveyor roller and a conveyor end roller. The conveyor belt is rotatably supported by the conveyor roller and the conveyor end roller to move a container through the tipper mechanism. The container may be a bucket which is generally cylindrical in shape, which has a top and a bottom. The bottom is frictionally supported by the conveyor belt. The conveyor roller and the conveyor end roller are thus rotatably attached to the conveyor frame.

In the preferred embodiment, the tipper mechanism is comprised of four actuators. Each actuator has a pneumatic cylinder, a cylinder rod and a cylinder housing, where the pneumatic cylinder is securely attached to the cylinder housing, and the cylinder housing is attached to the conveyor frame. The second and third actuators have a tip attached at a distal end of the respective cylinder rods to provide a non-damaging means of engagement to the container. The tip may be constructed of any material including plastic. The first and fourth actuators each have a stop attached to a distal end of the respective cylinder rod to provide a means of engagement to the container. The tipper mechanism further includes an electric eye which is mounted in the conveyor frame to detect passage of the container to initiate sequencing of the four actuators to tip the container.

In the preferred embodiment, when the container reaches a first position, the electric eye has sensed the passage of the container on the conveyor belt and initiates the sequencing of the four actuators. The first actuator extends to a first position and the fourth actuator extends to a first position. Once the stop of the first actuator extends to the first position, the container may not continue movement in the forward direction on the conveyor belt. The actuators are positioned on the conveyor frame, such that a distance d1 between an axis of the first actuator and an axis of the second actuator is optimal when slightly less than the diameter of the bottom of the container. Thus, when the container contacts the stop of the first actuator when the stop is in the first position, the tip of the second actuator may optimally contact the bottom of the container to begin rotation of the container. The distance d2 is the distance between the axis of the first actuator and the axis of the third actuator. The container has a center of gravity between its respective top and bottom. Thus, the stop of the first actuator being in the first position provides a mechanical moment, such that the container may be rotated about the stop. The container has a bottom center which is a perpendicular intersection of the center of gravity of the container with the bottom end of the container. Thus, distance d2 is optimal when slightly larger than the radius of the bottom of the container so that the bottom center is between the axis of the first actuator and the axis of the third actuator. This ensures the rotation of the container about the stop of the first actuator when the stop of the first actuator is in the first position.

In the preferred embodiment, once the first actuator blocks the base of the container from moving in the forward direction, the top of the container may be rotated in the forward direction over the base of the container. The first actuator engages the container at a first contact point at a forward side of the container to block the bottom of the container from moving in the forward direction. The first actuator extends the stop to the first position to block the bottom of the container.

In the preferred embodiment, the second actuator rotates the container to a first position. The second actuator engages the bottom of the container to lift the container at a second contact point to a first height where the container is rotated about the first contact point. The second contact point is located on the bottom of the container between the bottom center of the container and an edge of the bottom closest to the first station. The second actuator engages the bottom of the container with the tip to avoid damaging the container.

In the preferred embodiment, the third actuator rotates the container from a first position to a second position where the second position is midway between the initial orientation and the final orientation. The third actuator engages the bottom of the container to lift the container at a third contact point from the first height to a second height, where the container is rotated about the first contact point. The third contact point is located on the bottom of the container between the bottom center of the container and the second contact point. The third actuator extends the tip to a first position and provides sufficient momentum to rotate the container about the first contact point so that the center of gravity of the container is closer to the second station than the first contact point.

In the preferred embodiment, the fourth actuator blocks the top of the container from moving in the forward direction so that the first actuator may rotate the bottom of the container over the top of the container until the container is in the final orientation. The fourth actuator engages the container at a fourth contact point on the top of the container when the center of gravity of the container is closer to the second station than the first contact point in order to block the top of the container from moving in the forward direction. The fourth actuator is extended to a first position such that the center of gravity of the container being above the fourth contact point produces a mechanical moment about the fourth contact point. In the preferred embodiment, the first actuator extending from the first position to a second position when the center of gravity of the container is closer to the second station than the first contact point provides momentum to the container sufficient to complete rotation of the container about the fourth contact point to the final orientation.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
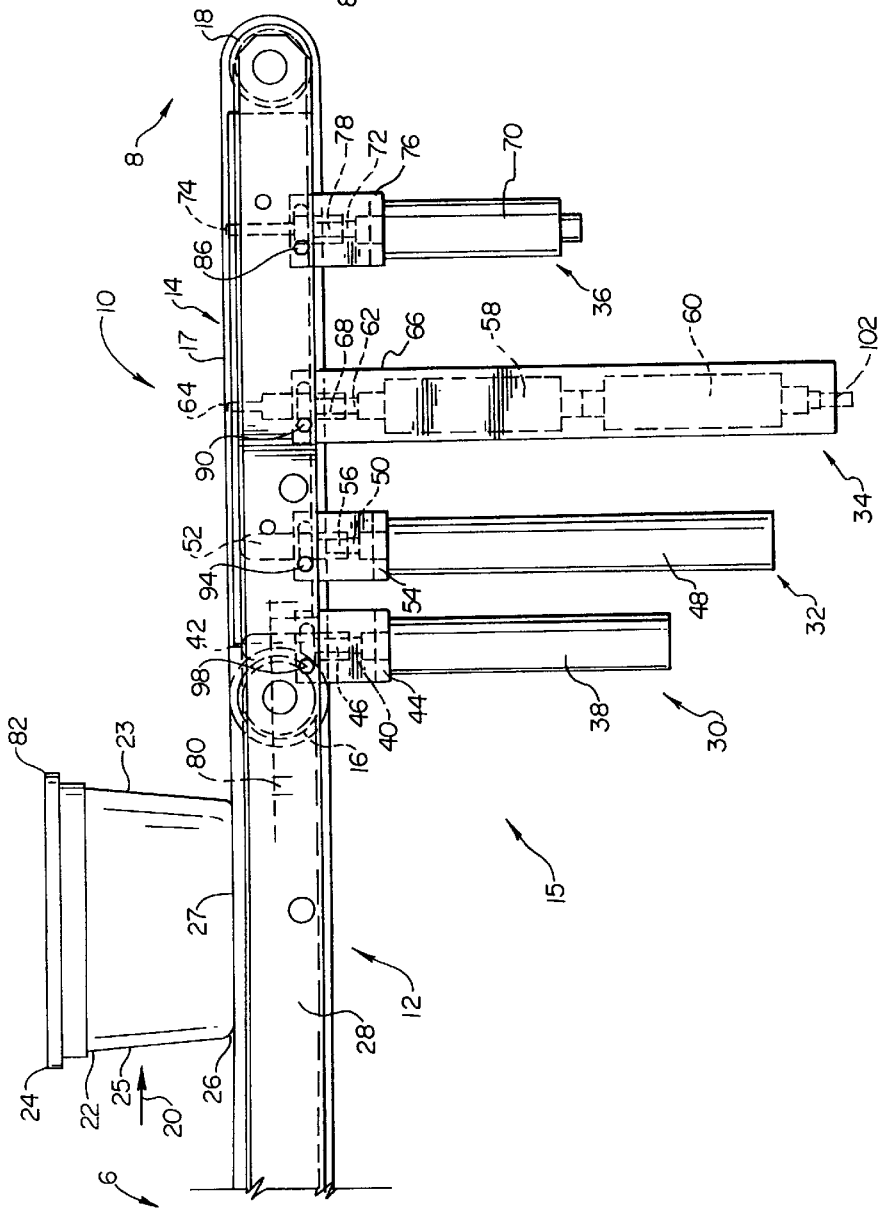
FIG. 1 is a side elevational view of the invention and workpiece approaching mechanism.

Referring now to the drawings, where like reference numerals refer to like elements throughout the several views, FIG. 1 is a side elevational view of the invention and workpiece approaching mechanism. The workpiece approaching mechanism is shown generally at 10, and includes a conveyor assembly 12 and a tipper mechanism 15. Conveyor assembly 12 comprises conveyor belt 14, conveyor roller 16, and conveyor end roller 18. Conveyor belt 14 is rotatably supported by conveyor roller 16, conveyor end roller 18, and one or more other conveyor rollers not shown. Conveyor roller 16 and conveyor end roller 18 are rotatably attached to conveyor frame 28. Conveyor belt 14 supports container 22 at surface 17 to move container 22 in the direction shown by arrow 20. Conveyor belt 14 moves container 22 from a first station 6 located before conveyor roller 16, through tipper mechanism 15 then on to a second station 8 located at or beyond conveyor end roller 18. Tipper mechanism 15 is located between the first station 6 and the second station 8. Container 22 has forward side 23 which is the side of container 22 which is closest to the second station 8, and a rear side 25 which is closest to the first station 6. Container 22 is a bucket which is generally cylindrical in shape, which has a top 24 and a bottom 26. Bottom 26 is frictionally supported by conveyor belt 14. Tipper mechanism 15 is comprised of actuator 30, actuator 32, actuator 34 and actuator 36. Tipper mechanism 15 rotates container 22 from an initial orientation to a final orientation, where the final orientation is defined by the top and bottom of the container being inverted from the initial orientation. Actuator 30 is comprised of pneumatic cylinder 38, cylinder rod 40, tip 42, and cylinder housing 44. Pneumatic cylinder 38 is securely attached to cylinder housing 44. Cylinder housing 44 in turn is securely held by conveyor frame 28. Tip 42 is attached at a distal end 46 of cylinder rod 40. Tip 42 provides a non-damaging means of engagement to container 22. Actuator 32 is comprised of pneumatic cylinder 48, cylinder rod 50, tip 52, and cylinder housing 54. Pneumatic cylinder 48 is securely attached to cylinder housing 54. Cylinder housing 54 in turn is securely held by conveyor frame 28. Tip 52 is attached at a distal end 56 of cylinder rod 50. Tip 52 provides a non-damaging means of engagement to container 22. Actuator 34 is comprised of pneumatic cylinder 58, pneumatic cylinder 60, cylinder rod 62, stop 64, and cylinder housing 66. Pneumatic cylinders 38 and 40 are securely attached to cylinder housing 66. Cylinder housing 66 in turn is securely held by conveyor frame 28. Stop 64 is attached at a distal end 68 of cylinder rod 40. Stop 64 provides a means of engagement to container 22. Actuator 36 is comprised of pneumatic cylinder 70, cylinder rod 72, stop 74, and cylinder housing 76. Pneumatic cylinder 70 is securely attached to cylinder housing 76. Cylinder housing 76 in turn is securely held by conveyor frame 28. Stop 74 is attached at a distal end 78 of cylinder rod 72. Stop 74 provides a means of engagement to container 22.

Actuators 30, 32, 34 and 36 are controlled by pneumatic means which are not shown. Electric eye 80 is mounted in conveyor frame 28 to detect passage of container 22 in the direction of arrow 20 on conveyor belt 14 to initiate sequencing of actuators 30, 32, 34 and 36. Container 22 is shown at position 82. Position 82 is prior to engagement of actuators 30, 32, 34 or 36 by container 22.

Figure 2:
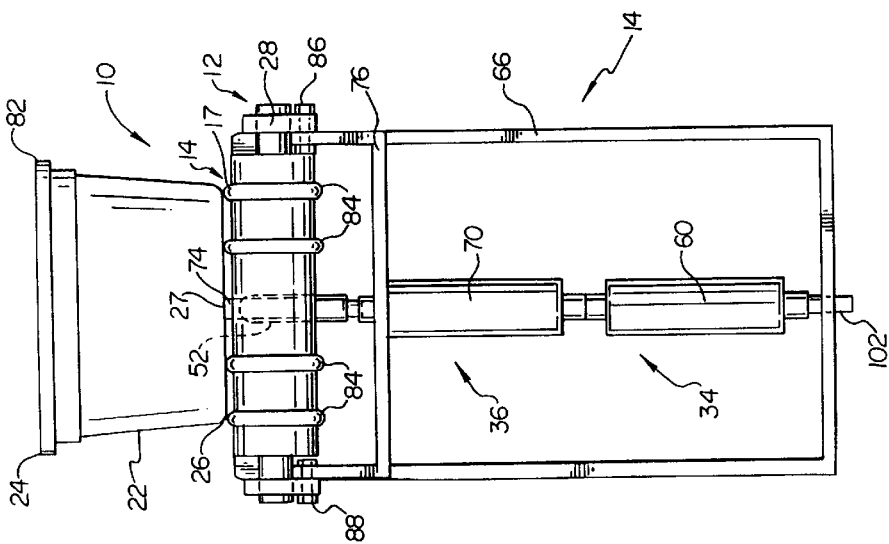
FIG. 2 is a front elevational view.

FIG. 2 is a front elevational view showing container 22 in position 82. Container 22 is shown being supported by ribs 84 of conveyor belt 14. FIG. 2 shows pneumatic cylinder 70 of actuator 36 supported by cylinder housing 76. Cylinder housing 76 is firmly attached to conveyor frame 28 via bolt 86 and bolt 88. In a likewise fashion, cylinder housing 66 is firmly attached to conveyor frame 28 via bolt 90 and bolt 92 (see, FIG. 3). Cylinder housing 54 is firmly attached to conveyor frame 28 via bolt 94 and bolt 96 (see, FIG. 3). Cylinder housing 44 is firmly attached to conveyor frame 28 via bolt 98 and bolt 100 (see, FIG. 3). FIG. 2 further shows pneumatic cylinder 60 being supported by and attached to cylinder housing 66 at proximal end 102. Pneumatic cylinder 60 is supported at proximal end 102 so pneumatic cylinder 58 and pneumatic cylinder 60 may be coupled together for a two-stage operation.

Figure 3:
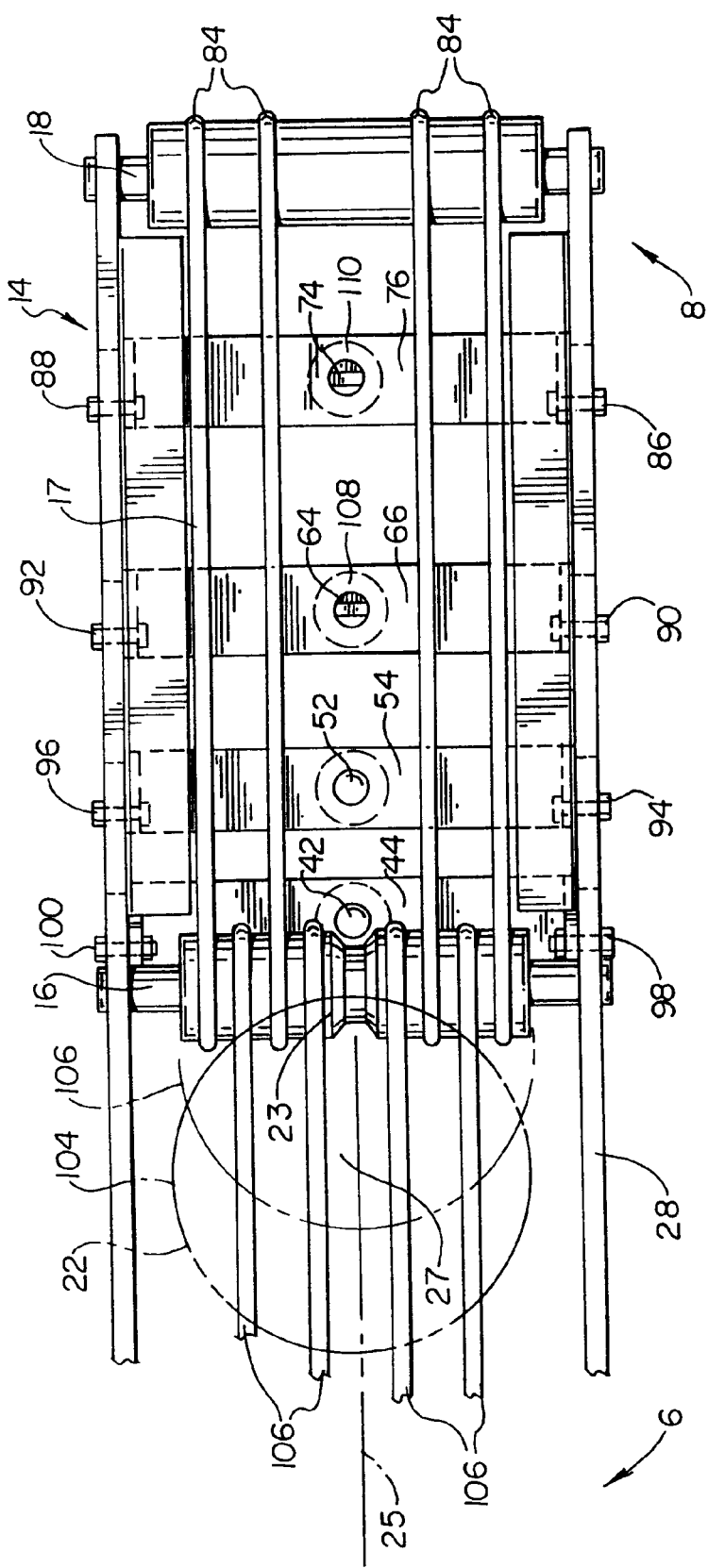
FIG. 3 is a top plan view thereof showing workpiece in phantom dashed line and slightly advanced from position of FIG. 1 and FIG. 2.

FIG. 3 is a top plan view showing the workpiece and a phantom dashed line in a position slightly advanced from the position of FIGS. 1 and 2. The workpiece shown in FIG. 3 is container 22. Container 22 is shown in position 104. FIG. 3 shows belts 84 of conveyor belt 14 supported by conveyor end roller 18 and conveyor roller 16. Conveyor belt 14 is further comprised of belts 106 which are rotatably supported by conveyor roller 16 and at least one other conveyor roller not shown. FIG. 3 shows tip 42 supported by and extending up through cylinder housing 44, tip 52 supported by and extending up through cylinder housing 54, stop 64 supported by and extending up through cylinder housing 66, and stop 74 supported by and extending up through cylinder housing 76. As container 22 moves in the direction of arrow 20 from position 82 to position 104, electric eye 80 is tripped, indicating the start of sequencing of actuators 30, 32, 34 and 36. Once in position 104, stop 64 has extended to a first position 108, and stop 74 has extended to a first position 110 (see also, FIG. 4). As conveyor belt 14 is further advanced in the direction of arrow 20, container 22 continues to move from position 104 to position 106.

Figure 4:
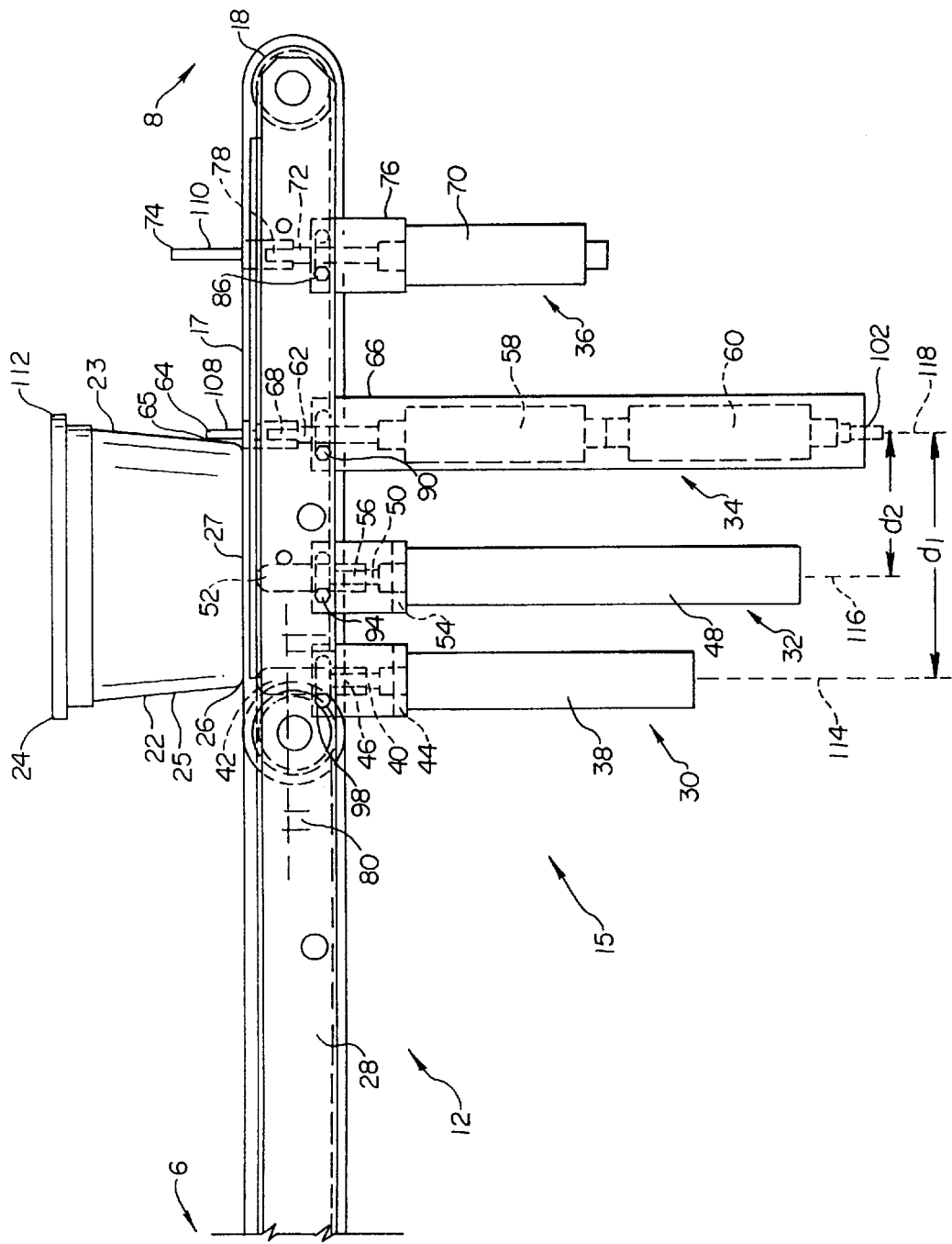
FIG. 4 is a view similar to that of FIG. 1 with workpiece advanced to mechanical stop.

FIG. 4 is a view similar to that of FIG. 1 with container 22 advanced to position 112. Once container 22 reaches position 104, electric eye 80 has sensed the passage of container 22 on conveyor belt 14 and begins the sequencing of actuators 30, 32, 34 and 36. Actuator 34 extends to a first position 108, and actuator 36 extends to a first position 110. The extension of stop 64 to first position 108 is caused by activation of pneumatic cylinder 60. The extension of stop 74 to first position 110 is caused by activation of pneumatic cylinder 70. Tip 42 and cylinder rod 40 have a common axis 114. Tip 52 and cylinder rod 50 have a common axis 116. Stop 64 and cylinder rod 62 have a common axis 118. Actuators 30, 32 and 34 are optimally positioned on conveyor frame 28. Distance d1 between axis 114 of actuator 30 and axis 118 of actuator 34 is optimal when slightly less than the diameter of bottom 26. Thus, when container 22 contacts stop 64 when stop 64 is in first position 108, tip 42 may optimally contact bottom 26 of container 22 when actuator 30 is activated to begin rotation of container 22. Distance d2 is between axis 116 of actuator 32 and axis 118 of actuator 34. Container 22 has a center of gravity between top 24 and bottom 26. Stop 64 being in first position 108 provides a mechanical moment between the center of gravity and a first contact point 65 so that container 22 may be rotated over stop 64. First contact point 65 is the point of contact of stop 64 with the surface of container 22 at forward side 23. Once stop 64 extends to first position 108 and contacts the surface of the container at first contact point 65, bottom 26 of container 22 may not continue movement in the direction of arrow 20 to allow top 24 of container 22 to be rotated over bottom 26 in the forward direction of arrow 20. Container 22 further has a bottom center 27 which is the perpendicular intersection of the center of gravity of container 22 with end 26. Distance d2 is optimal when slightly larger than the radius of bottom 26 of container 22 so that the bottom center 27 is between axis 116 and axis 118. This insures rotation of container 22 about stop 64 when stop 64 is in first position 108 (see also, FIG. 5).

Figure 5:
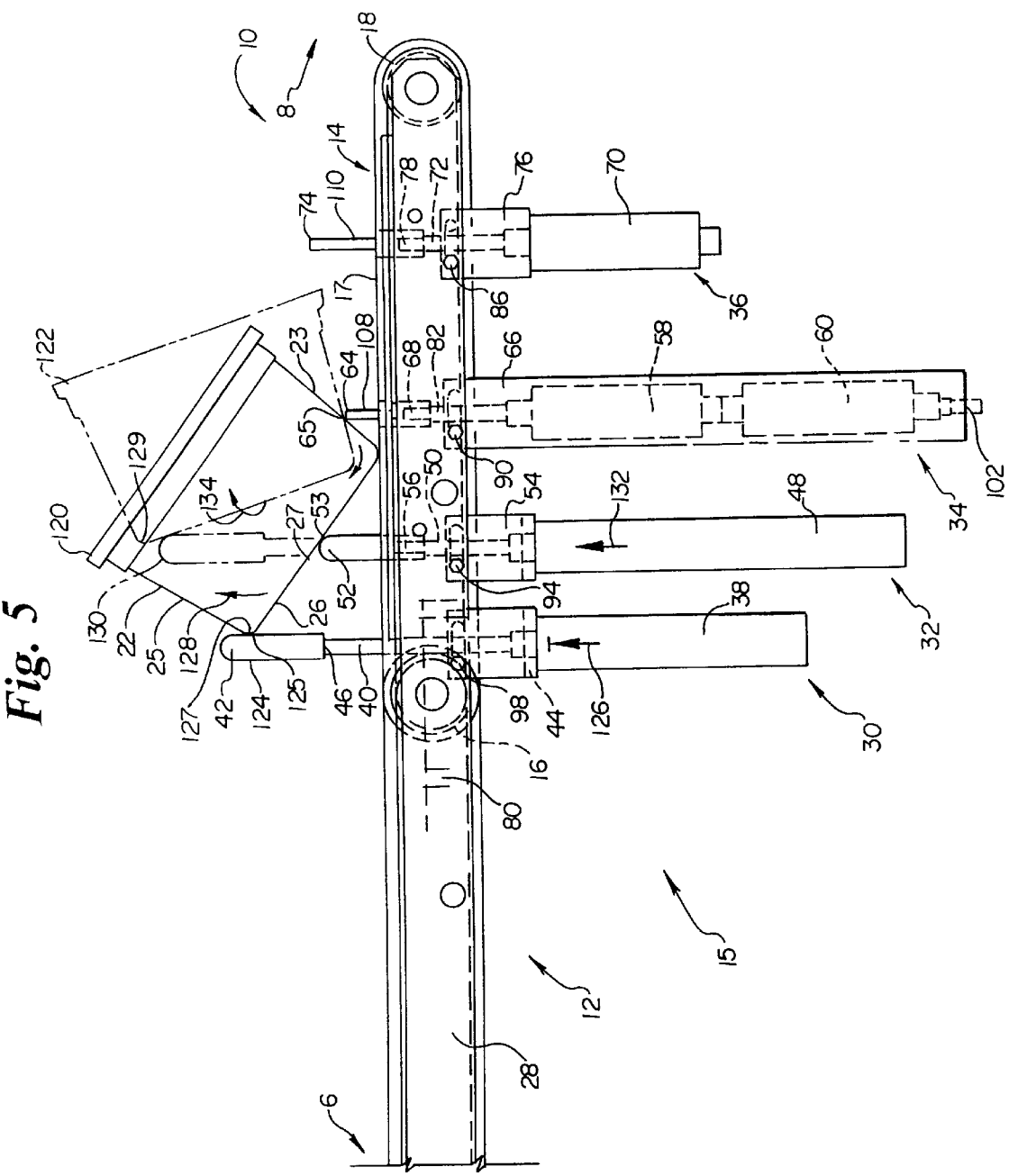
FIG. 5 is a view similar to that of FIG. 4 with workpiece advanced to rotate against stop due to initiation of mechanism and shown to continue to rotate shown in phantom dashed line.

FIG. 5 is a view similar to that of FIG. 4 with container 22 advanced to rotate against stop 64. FIG. 5 shows container 22 in position 120 with subsequent rotation to position 122 over first contact point 65. Actuator 30 is activated and lifts tip 42 to a first position 124. Tip 42 contacts bottom 26 of container 22 at second contact point 125. The extension of tip 42 to first position 124 while contacting bottom 26 rotates container 22 to position 112 from position 120 over first contact point 65. This extension of tip 42 to first position 124 lifts the bottom of container 22 to a first height 127. First height 127 is the distance between bottom 26 of container 22 which is closest to rear side 25 of container 22 and the surface 17 of the conveyor belt 14 when tip 42 is in position 124. Tip 42 being extended to first position 124 in the direction of arrow 126 results in rotation of container 22 in the direction shown by arrow 128. Once tip 42 reaches first position 124, tip 52 extends to a first position 130 in the direction of arrow 132 to rotate container 22 from position 120 to position 122 about first contact point 65 in the direction shown by arrow 134. Movement of container 22 from position 120 to position 122 is accomplished by moving tip 52 in the direction of arrow 132. Tip 52 contacts bottom 26 of container 22 at third contact point 53. Third contact point 53 is located on bottom 26 of container 22 between bottom center 27 of container 22 and second contact point 125. This extension of tip 52 to first position 130 lifts the bottom of container 22 from the first height 127 to a second height 129. Second height 129 is distance between bottom 26 of container 22 which is closest to rear side 25 of container 22 and the surface 17 of the conveyor belt 14 when tip 52 is in first position 130. The rotation of container 22 from position 120 to position 122 provides sufficient momentum to enable the center of gravity of the container to pass beyond stop 64 in the direction of arrow 20 and to a position closer to second station 8 than stop 64.

Figure 6:
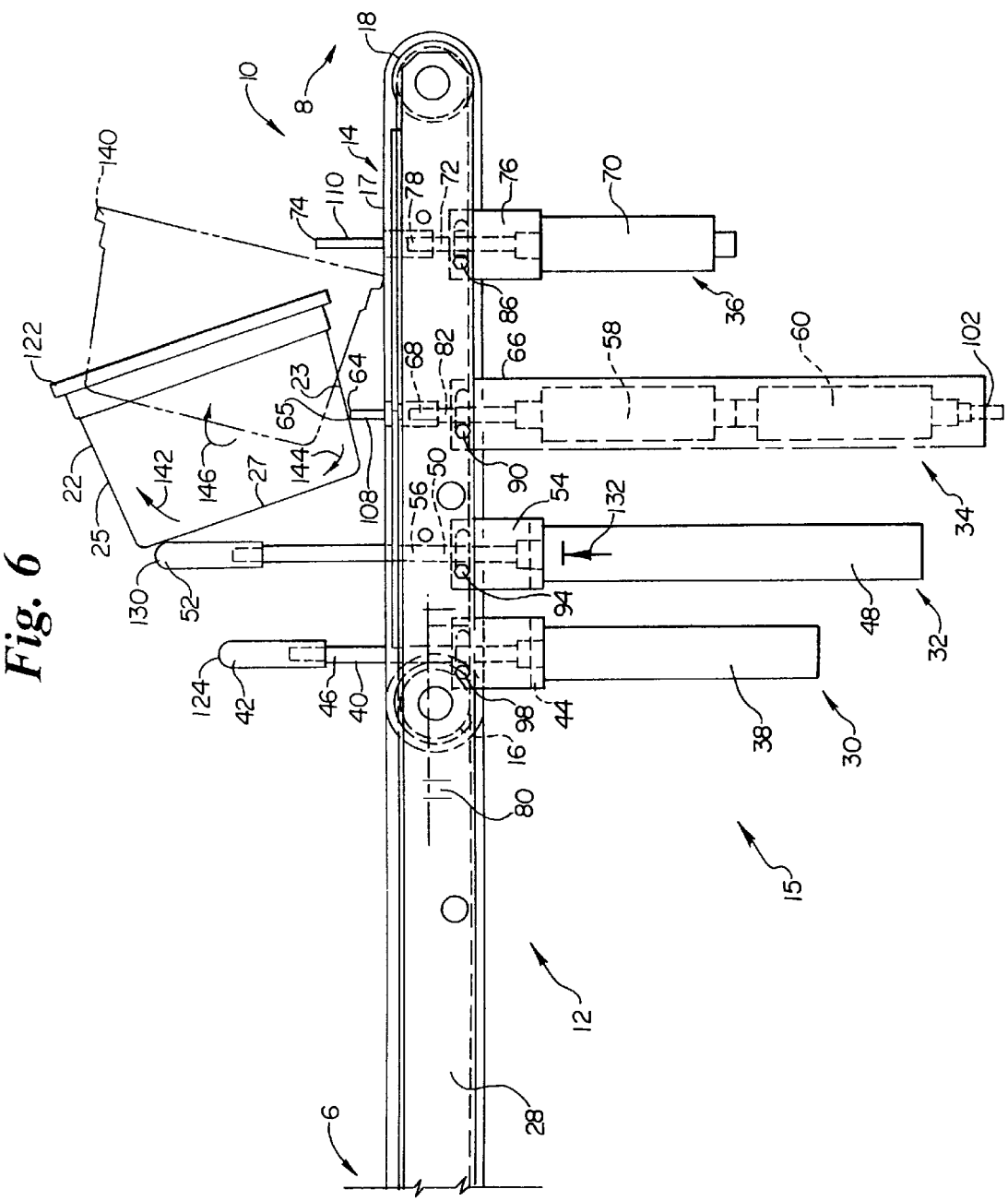
FIG. 6 is a view similar to that of FIG. 5 with workpiece advanced to rotate due to further action of mechanism and momentum of workpiece shown in phantom dashed line.

FIG. 6 is a view similar to that of FIG. 5 with container 22 advanced to rotate from position 122 to position 140. Tip 42 of actuator 30 is in first position 124. Tip 52 of actuator 32 is fully extended to first position 130. In comparison to FIG. 5, the momentum of container 22 from traveling in the direction of arrow 20 once tip 52 is fully extended to first position 130 in the direction of arrow 132, results in container 22 rotating in the direction shown by arrows 142 and 144, while continuing the forward motion shown by arrow 20 to rotate in the direction of arrow 146 to position 140. Thus, it is understood that the tipping and tumbling being exhibited by movement in the direction shown by arrows 142, 144 and 146 results from a combination of a forward momentum of container 22 in the direction of arrow 20, and the extension of tip 42 to first position 124 in the direction of arrow 126, and the extension of tip 52 to first position 130 in the direction of arrow 132. Thus, the size and weight of container 22 determines the required speed of travel of container 22 in the direction of arrow 20, as well as the distance of extension of tip 42 to first position 124 and tip 52 to first position 130, necessary to overturn container 22.

Figure 7:
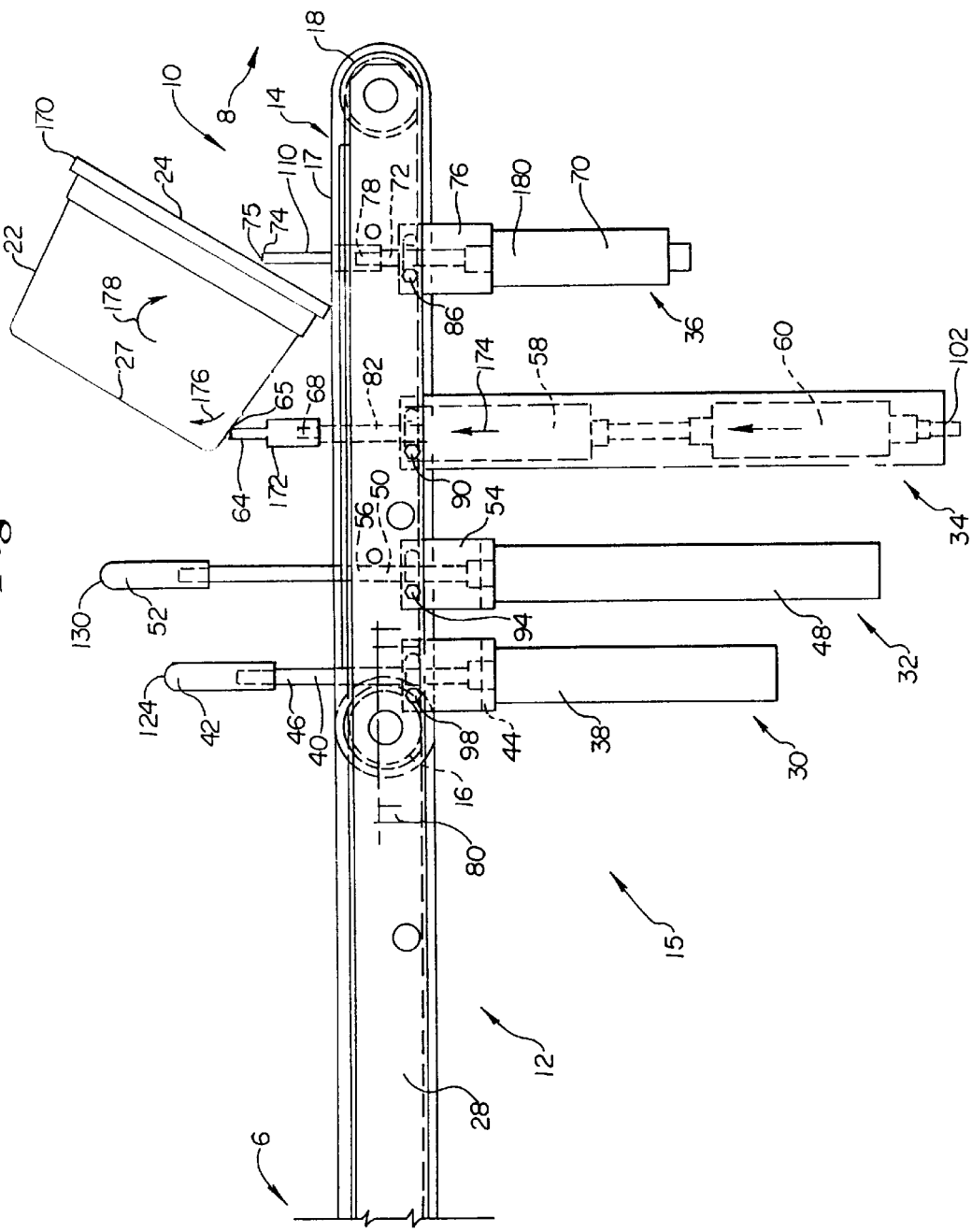
FIG. 7 is a view similar to that of FIG. 6 with workpiece advanced to continue to rotate due to yet further action of mechanism shown in phantom dashed line.

FIG. 7 is a view similar to that of FIG. 6 with container 22 advanced to continue to rotate to position 170. Tip 42 of actuator 30 is in position 124, and tip 52 of actuator 32 is in position 130. Stop 74 of actuator 36 is in position 110. Stop 64 of actuator 34 extends from first position 108 to second position 172. Pneumatic cylinder 58 moves stop 64 in the direction of arrow 174 to position 172. Stop 64 extending from position 108 to position 172 causes container 22 to continue to rotate in the direction of arrows 176 and 178. Stop 74, currently in position 110, begins retracting in the direction of arrow 180 to allow top 24 of container 22 to be supported by conveyor belt 14. Stop 74 contacts container 22 at fourth contact point 75 on top 24 when the center of gravity of container 22 is closer to second station 8 than first contact point 65 to block top 24 of container 22 at fourth contact point 75 from moving in the forward direction in the direction of arrow 20. The center of gravity of container 22 being above fourth contact point 75 produces a mechanical moment about fourth contact point 75 so that when stop 64 of actuator 34 extends from first position 108 to second position 172, stop 64 provides a momentum to container 22 sufficient to complete rotation of container 22 about fourth contact point 75 to the final orientation.

Figure 8:
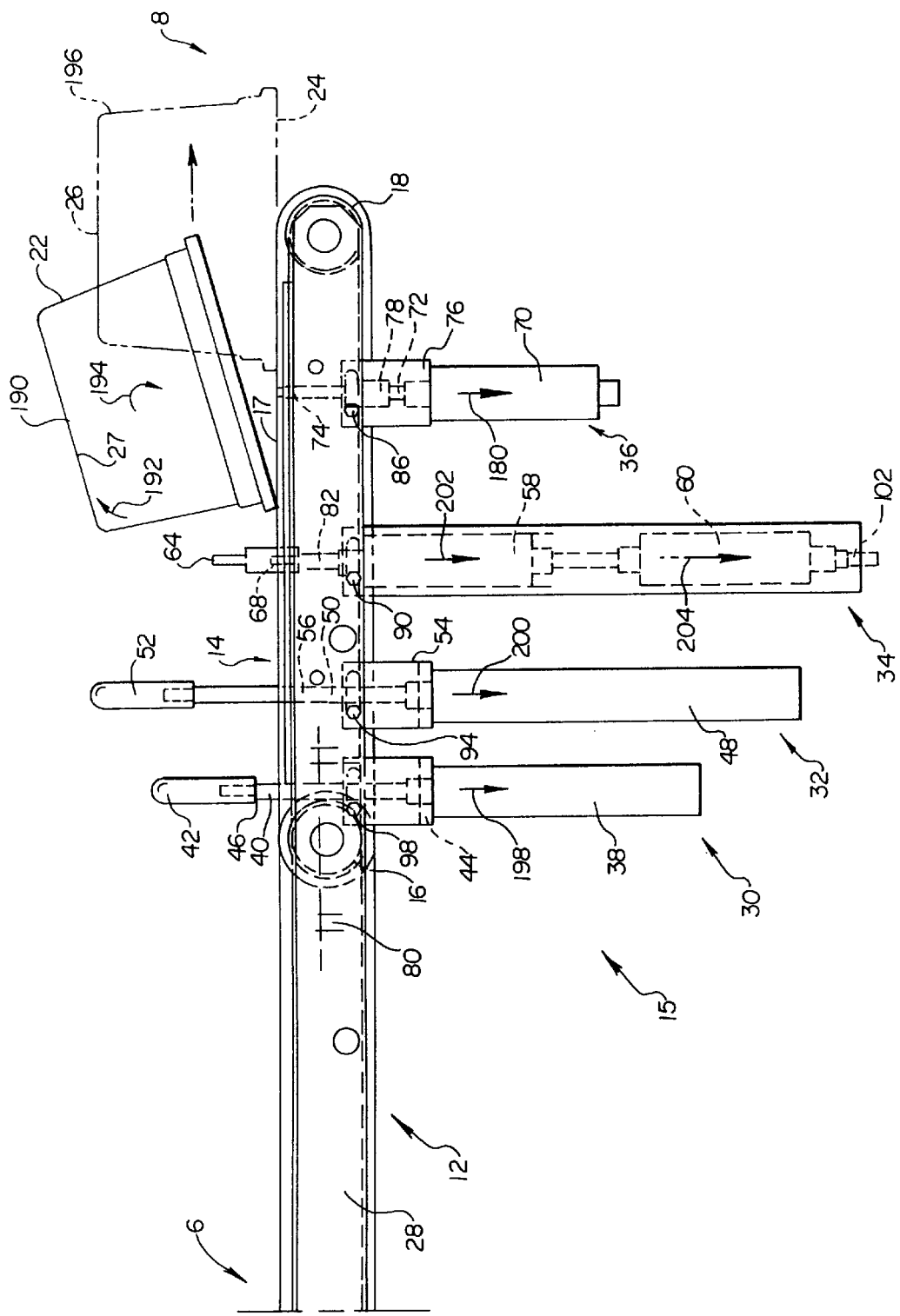
FIG. 8 is a view similar to that of FIG. 7 with workpiece advanced to completely tip over and assume inverse position due to final action of mechanism and showing workpiece advancing to discharge position shown in phantom dashed line.

FIG. 8 is a view similar to that of FIG. 7 with container 22 rotated to be completely tipped over. FIG. 8 shows container 22 in position 190 after further rotation in the direction of arrows 192 and 194. Rotation of container 22 in the direction of arrows 192 and 194 was initiated by stop 64 extending from first position 108 to second position 172, in addition to the momentum of container 22 in the direction of arrow 20. Container 22 falls to position 196 so that top 24 is supported on conveyor belt 14. Position 196 is the final orientation of container 22. Position 112 is the initial orientation of container 22. In the final orientation, top 24 and bottom 26 of container 22 are inverted from the initial orientation in a direction parallel with axis 114, 116 or 118. Tip 42 is then retracted in the direction of arrow 198 to a fully retracted position. Tip 52 is retracted in the direction of arrow 200 to a fully retracted position. Stop 64 is retracted in the direction of arrows 202 and 204 to a fully retracted position. Stop 74 is shown in the fully retracted position having been retracted in the direction of arrow 180 (see also, FIG. 7). Once container 22 is in position 196, conveyor belt 14 may carry container 22 to the next step in the process or to a final storage area.

Having thus described the preferred embodiments of the present invention, those of skill in the art will readily appreciate that the teachings found herein may be applied to yet other embodiments within the scope of the claims hereto attached.

What is claimed is:

1. An apparatus for tipping a container, the container having a top, a bottom, and one or more sides between the top and the bottom, comprising:
   a. advancing means for advancing the container in a forward direction from a first station to a second station, the container being in an initial orientation; and
   b. means for rotating the container to a final orientation, said means for rotating being positioned on said advancing means between said first station and said second station for receiving the container from said first station and rotating the container to said final orientation, said means for rotating providing said container to said advancing means to be moved to said second station, said final orientation being defined by the top and bottom of the container being inverted from the initial orientation, said rotating means further comprising:
      i. first actuator means to block the bottom of the container from moving in the forward direction so that the top of the container may be rotated in the forward direction over the bottom of the container;
      ii. second actuator means for rotating the container to a first position;
      iii. third actuator means for rotating the container from said first position to a second position, said second position being midway between the initial orientation and the final orientation; and
      iv. fourth actuator means to block the top of the container from moving in the forward direction so that the first actuator means may rotate the bottom of the container over the top of the container until the container is in the final orientation;
      v. wherein said first actuator means further engages the container at a first contact point on a forward side of the container to block the bottom of the container from moving in the forward direction, the first actuator means being extended to a first position, the container having a center of gravity closer to the top of the container than said first contact point producing a mechanical moment about said first contact point, said forward side of the container being the side of the container closest to the second station, a rear side of the container being the side of the container closest to the first station, a bottom center being the perpendicular intersection of said center of gravity with the bottom, said bottom center being disposed between said forward side and said rear side.

2. An apparatus according to claim 1 wherein the second actuator means engages the bottom of the container to lift the container at a second contact point, the container being rotated about the first contact point, the second contact point being located on the bottom of the container between the bottom center of the container and an edge of the bottom closest to the first station, the second actuator means being extended to a first position.

3. An apparatus according to claim 2 wherein the third actuator means engages the bottom of the container to lift the container at a third contact point, the container being rotated about the first contact point, the third contact point being located on the bottom of the container between the bottom center of the container and the second contact point, the third actuator means being extended to a first position, the third actuator means providing a momentum sufficient to rotate the container about the first contact point so that the center of gravity of the container is closer to the second station than the first contact point.

4. An apparatus according to claim 3 wherein the fourth actuator means engages the container at a fourth contact point on the top of the container when the center of gravity of the container is closer to the second station than the first contact point to block the top of the container from moving in the forward direction, the fourth actuator means being extended to a first position, the center of gravity of the container being above the fourth contact point producing a mechanical moment about said fourth contact point, said first actuator means being extended from the first position to a second position when the center of gravity of the container is closer to the second station than the first contact point providing a momentum to the container sufficient to complete rotation of the container about said fourth contact point to the final orientation.

5. An apparatus according to claim 4 wherein the means for advancing is a conveyor assembly comprising:
   a. a conveyor frame;
   b. a conveyor belt; and
   c. a plurality of conveyor rollers rotatably attached to said conveyor frame between the first station and the second station such that an axis of rotation of a particular one of the plurality of conveyor rollers is parallel and aligned with an axis of rotation of every other one of said plurality of conveyor rollers, said plurality of conveyor rollers rotatably supporting said conveyor belt.

6. An apparatus according to claim 5 wherein the first actuator means comprises:
   a. a first rod;
   b. first means to adjust said first rod coupled to a lower end of said first rod, said first means to adjust vertically positioning said first rod in a direction transverse to the forward direction of travel of the container, said first means to adjust attached to the conveyor frame between the first one of the plurality of conveyor rollers and a second on of the plurality of conveyor rollers, the first one of the plurality of rollers being closer to the first station than the second one of the plurality of rollers; and
   c. a stop attached to an upper end of said first rod to block the bottom of the container from moving in the forward direction.

7. An apparatus according to claim 6 wherein the first means to adjust is a pneumatic cylinder.

8. An apparatus according to claim 6 wherein the first means to adjust is a hydraulic cylinder.

9. An apparatus according to claim 6 wherein the first means to adjust is a solenoid.

10. An apparatus according to claim 6 wherein the second actuator means comprises:
    a. a second rod;
    b. second means to adjust said second rod to a first position coupled to a lower end of said second rod, said second means to adjust vertically positioning said second rod in a direction transverse to the forward direction of travel of the container, said second means to adjust attached to the conveyor frame between the first one of the plurality of conveyor rollers and the first actuator means, a distance between the first actuator means and the second actuator means being less than a maximum length of the bottom of the container in a direction parallel to the forward direction; and
    c. a tip attached to an upper end of said second rod to engage the bottom of the container to lift the container to the first height, said first height defined as a distance between the bottom of the container which is closest to the rear side of the container and the conveyor belt when said second rod is in said first position.

11. An apparatus according to claim 10 wherein the second means to adjust is a pneumatic cylinder.

12. An apparatus according to claim 10 wherein the second means to adjust is a hydraulic cylinder.

13. An apparatus according to claim 10 wherein the second means to adjust is a solenoid.

14. An apparatus according to claim 10 wherein the third actuator means comprises:
    a. a third rod;
    b. third means to adjust said third rod to a first position coupled to a lower end of said third rod, said third means to adjust vertically positioning said third rod in a direction transverse to the forward direction of travel of the container, said third means to adjust attached to the conveyor frame between the second actuator means and the bottom center of the container; and
    c. a tip attached to an upper end of said third rod to engage the bottom of the container to lift the container from the first height to the second height, said second height defined as a distance between the bottom of the container which is closest to the rear side of the container and the conveyor belt when said third rod is in said first position.

15. An apparatus according to claim 14 wherein the third means to adjust is a pneumatic cylinder.

16. An apparatus according to claim 14 wherein the third means to adjust is a hydraulic cylinder.

17. An apparatus according to claim is 14 wherein the third means to adjust is a solenoid.

18. An apparatus according to claim 14 wherein the fourth actuator means comprises:
    a. a fourth rod;
    b. fourth means to adjust said fourth rod to a first position coupled to a lower end of said fourth rod, said fourth means to adjust vertically positioning said fourth rod in a direction transverse to the forward direction of travel of the container, said fourth means to adjust attached to the conveyor frame between the first actuator means and the second one of the plurality of rollers; and
    c. a stop attached to an upper end of said fourth rod to block the top of the container from moving in the forward direction.

19. An apparatus according to claim 18 wherein the fourth means to adjust is a pneumatic cylinder.

20. An apparatus according to claim 18 wherein the fourth means to adjust is a hydraulic cylinder.

21. An apparatus according to claim 18 wherein the fourth means to adjust is a solenoid.

22. A method for tipping a container, the container having a top, a bottom, and one or more sides between the top and the bottom, comprising the steps of:

a. advancing the container in a forward direction from a first station to a second station, the container being in an initial orientation; and
b. rotating the container to a final orientation, the final orientation being defined by the top and bottom of the container being inverted from the initial orientation;
c. wherein the step of rotating the container further comprises the steps of:
   i. blocking the bottom of the container from moving in the forward direction so that the top of the container may be rotated in the forward direction over the bottom of the container;
   ii. rotating the container to a first position;
   iii. rotating the container from said first position to a second position, said second position being midway between the initial orientation and the final orientation;
   iv. blocking the top of the container from moving in the forward direction; and
   v. rotating the bottom of the container over the top of the container until the container is in the final orientation.

* * * * *